United States Patent [19]
Kano

[11] Patent Number: 5,347,414
[45] Date of Patent: Sep. 13, 1994

[54] MAGNETIC DISK DRIVE WITH A CONTROLLABLY POSITIONED FLOATING MAGNETIC HEAD

[75] Inventor: Hisashi Kano, Osaka, Japan

[73] Assignee: Matsushita Electric Industrial Co., Ltd., Osaka, Japan

[21] Appl. No.: 674,908

[22] Filed: Mar. 26, 1991

[30] Foreign Application Priority Data

Mar. 27, 1990 [JP] Japan .................. 2-77849

[51] Int. Cl.$^5$ .............................................. G11B 5/54
[52] U.S. Cl. .................................... 360/105; 360/104
[58] Field of Search .............. 360/104, 105, 106, 103

[56] References Cited

U.S. PATENT DOCUMENTS

| | | | |
|---|---|---|---|
| 4,392,165 | 7/1983 | Wright | 360/104 |
| 4,535,374 | 8/1985 | Anderson et al. | 360/103 |
| 4,605,979 | 8/1986 | Inoue et al. | 360/105 |
| 4,644,429 | 2/1987 | Boe | 360/105 |
| 4,722,012 | 1/1988 | Toldi et al. | 360/105 |
| 4,742,410 | 5/1988 | Smith | 360/105 |
| 4,829,396 | 5/1989 | Okutsu | 360/105 |
| 5,023,737 | 6/1991 | Yaeger | 360/105 |
| 5,057,954 | 10/1991 | O'Sullivan et al. | 360/105 |
| 5,068,841 | 11/1991 | Nakayama et al. | 360/104 |
| 5,079,652 | 1/1992 | Ishida et al. | 360/105 |

FOREIGN PATENT DOCUMENTS

| | | |
|---|---|---|
| 0108500 | 5/1984 | European Pat. Off. . |
| 2178585 | 2/1987 | United Kingdom . |
| 8304129 | 11/1983 | World Int. Prop. O. . |

*Primary Examiner*—Stuart S. Levy
*Assistant Examiner*—Paul J. Ditmyer
*Attorney, Agent, or Firm*—Pollock, Vande Sande & Priddy

[57] ABSTRACT

A magnetic disk drive includes a resilient load pin engageable with a flexure to urge the same until a floating magnetic head having a negative pressure slider is displaced toward a magnetic head beyond a floating position. This ensures that the magnetic head is placed into the floating position even when it is slightly displaced from an accurate assembling position due to an assembling error. Since the resilient load pin is resiliently bendable when it urges the flexure in a direction to move the magnetic head toward the magnetic disk beyond the floating position, a frictional engagement between the magnetic head and the magnetic disk does not take place.

13 Claims, 8 Drawing Sheets

MAGNETIC DISK DRIVE WITH A CONTROLLABLY POSITIONED FLOATING MAGNETIC HEAD

BACKGROUND OF THE INVENTION

1. Field of the Invention

The present invention relates to a magnetic disk drive including a magnetic head for recording data onto a magnetic recording medium, such as a magnetic disk, and reading the data from the magnetic recording medium.

2. Description of the Prior Art

As shown in FIG. 10., a conventional magnetic disk drive includes a plurality (two being shown) of parallel spaced magnetic disks 1, 2 mounted on a single rotary shaft or spindle (not shown). An access arm 3 is driven by a voice coil motor (not shown) and movable in a direction parallel to the plane of the magnetic disks 1, 2. A pair of flexures 4, 5 each formed of a stamped plate spring are secured by clinching to opposite sides of the arm 3. The flexure 4 is disposed in confrontation with the magnetic disk 1, while the flexure 5 is disposed in confrontation with the magnetic disk 2. The flexures 4, 5 are bent inwardly toward each other at portions adjacent to the fixed ends thereof. Floating magnetic heads 6, 7 are carried on the distal ends of the respective flexures 4, 5 at the sides which face toward the corresponding magnetic disks 1. The magnetic heads 6, 7 have negative pressure or suction sliders 6a, 7a and, when the flexures 4, 5 are not subjected to external forces, the magnetic heads 6, 7 are spaced far from the recording surfaces of the respective magnetic disks 1, 2. The floating magnetic heads 6, 7 are identical in construction and hence a description given below is directed to only one magnetic head 6. The magnetic head 6 includes, as shown in FIG. 15, a pair of laterally spaced cores 6b, 6c attached to one side of the negative pressure slider 6a with a pair of spacers 6d, 6e of non-magnetic material disposed between corresponding ones of the cores 6b, 6c and the negative pressure slider 6a. The spacers 6d, 6e provide magnetic gaps between the negative pressure slider 6a and the magnetic cores 6b, 6c. The magnetic core 6b has a lead wire 6f wound therearound for performing magnetic data recording/reproducing operation through the lead wire 6f. The slider 6a is a substantially rectangular body of a magnetic material such as ferrite and includes a substantially U-shaped floating rail 6g which serves to develop a positive pressure as the magnetic head 6 approaches the magnetic disk 1 (FIG. 10). The U-shaped floating rail 6g has two recessed portions 6h, 6h at central portions of the respective arms and defines a rectangular central recess 6i which communicates with the recesses portions 6h. The central recess 6i serves to develop a negative pressure or suction when the magnetic head 6 approaches the magnetic disk 1. During that time, a stream of air flows from one side A (which is remote from the cores 6b, 6c) to the opposite side B of the magnetic head 6. Referring back to FIG. 10, a pusher rod 8 is disposed centrally between the flexures 4, 5 and is connected at its one end to a rotary shaft 8a. When the rotary shaft 8a turns about its own axis in the direction indicated by the arrow C in FIG. 10, the pusher rod 8 is displaced in a direction from the arm 3 toward the heads 6, 7, thereby forcing the flexures 4, 5 outwardly toward the magnetic disks 1, 2. For the purpose of forcing the flexures 4, 5, the pusher rod 8 is made of a rigid, inflexible material and has a diameter substantially the same as the width of the arm 3; if not so, the pusher rod 8, as it moves toward the heads 6, 7 to spread the flexures 4, 5, is flexed or bent at an intermediate portion thereof, thus failing to bring the flexures 4, 5 near to the magnetic disks 1, 2.

The conventional magnetic disk drive of the foregoing construction operates as follows.

The magnetic disks 1, 2 are rotated and, after a predetermined rotational speed of the magnetic disks 1, 2 is reached, the rotary shaft 8a is turned in the direction of the arrow C in FIG. 10 to thereby move the pusher rod 8 in the direction indicated by the arrow D shown in FIG. 11. Thus, the pusher rod 8 forces the flexures 4, 5 to resiliently deform or bend outwardly toward the corresponding magnetic disks 1, 2 so that the magnetic heads 6, 7 come close to the corresponding magnetic disks 1, 2, as shown in FIG. 12. When the magnetic heads 6, 7 reach the respective positions (floating positions) which are spaced from the magnetic disks 1, 2 by a predetermined distance, dynamic pressures are produced and act on the respective magnetic heads 6, 7 to hold them immovable while keeping a constant spacing between the magnetic heads 6, 7 and the magnetic disks 1, 2, as shown in FIG. 13. (This condition is referred to as "floating condition".) The magnetic heads 6, 7 while kept in the floating condition undertake the data recording/reproducing operation relative to the corresponding magnetic disks 1, 2. In this instance, each of the magnetic heads 6, 7 is subjected to a positive pressure tending to separate the magnetic head 6, 7 from the corresponding magnetic disk 1, 2, a negative pressure or suction tending to pull the magnetic head 6, 7 toward the magnetic disk 1, 2, and a resiliency of the corresponding flexure 4, 5 tending to pull the magnetic head 6, 7 away from the magnetic disk 1, 2. In the floating condition, a combined force of the positive pressure and the resiliency of the flexure 4, 5 is in balance with the negative pressure.

According to the conventional construction, the pusher rod 8 is likely to be displaced off the center between the two flexures 4, 5 due to an assembling error. If the pusher rod 8 is slightly displaced toward the magnetic disk 1 from the center between the flexures 4, 5, as shown in FIG. 14, the magnetic head 7 carried on the flexure 5 is far distant from the magnetic disk 2 beyond a predetermined spacing which is effective to produce the dynamic pressure acting on the magnetic head 7. The magnetic head 7 is, therefore, unable to float over the magnetic head 2 with the result that the data recording/reproducing operation cannot be performed. Furthermore, when the rotary shaft 8a is distorted, the pusher rod 8 moves at an angle to the plane of each magnetic disk 1, 2. In this instance, if the pusher rod 8 is displaced toward the magnetic disk 1 as shown in FIG. 14, the magnetic head 6 is forced into friction contact with the surface of the magnetic disk 1 and hence sustains damage or damages the magnetic disk 1.

SUMMARY OF THE INVENTION

With the foregoing difficulties of the prior art in view, it is an object of the present invention to provide a magnetic disk drive incorporating structural features which are capable of displacing a floating magnetic head closely toward a magnetic disk until a dynamic pressure is active on the magnetic head even when an assembling error is involved.

According to the present invention, there is provided a magnetic disk drive which comprises at least one magnetic disk; a floating magnetic head having a negative pressure slider and confronting the magnetic disk to undertake at least one of a magnetic data recording operation and a magnetic data reading operation relative to the magnetic disk; a flexure carrying thereon the magnetic head; and a resilient load pin engageable with the flexure to urge the same toward the magnetic disk for displacing the magnetic head toward the magnetic disk. It is preferable that the load pin is engageable with a substantially central portion of the flexure and is formed of an etched metal. The load pin is resiliently bendable when it urges the flexure to move the magnetic head toward the magnetic disk beyond a floating position.

In the case where two such magnetic disks are used, the magnetic disk drive includes a pair of flexures attached to the arm and confronting the magnetic disks, respectively, a pair of floating magnetic heads having a pair of negative pressure sliders, respectively, a pair of resilient pusher members engageable with the flexures, respectively, carried on front ends of the respective flexures at the sides which face toward corresponding ones of the magnetic disks to urge them toward the magnetic disks until the magnetic heads are displaced toward the magnetic disks beyond a floating position, and means for urging the pusher members toward the flexures. Each of the resilient pusher members comprises a load pin, and the urging means comprises a rigid pin. According to a preferred embodiment, the resilient load pins have a pair of spaced oblique portions, respectively, extending convergently toward their front ends and a pair of parallel spaced portions, respectively, extending contiguously from the front ends of the respective oblique portions and confronting one another. A rigid pin is normally disposed in a space defined between the oblique portions of the load pins and movable toward the parallel portions to spread the load pins for causing them to force the flexures toward the magnetic disks, thereby displacing the magnetic heads toward the magnetic disks.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
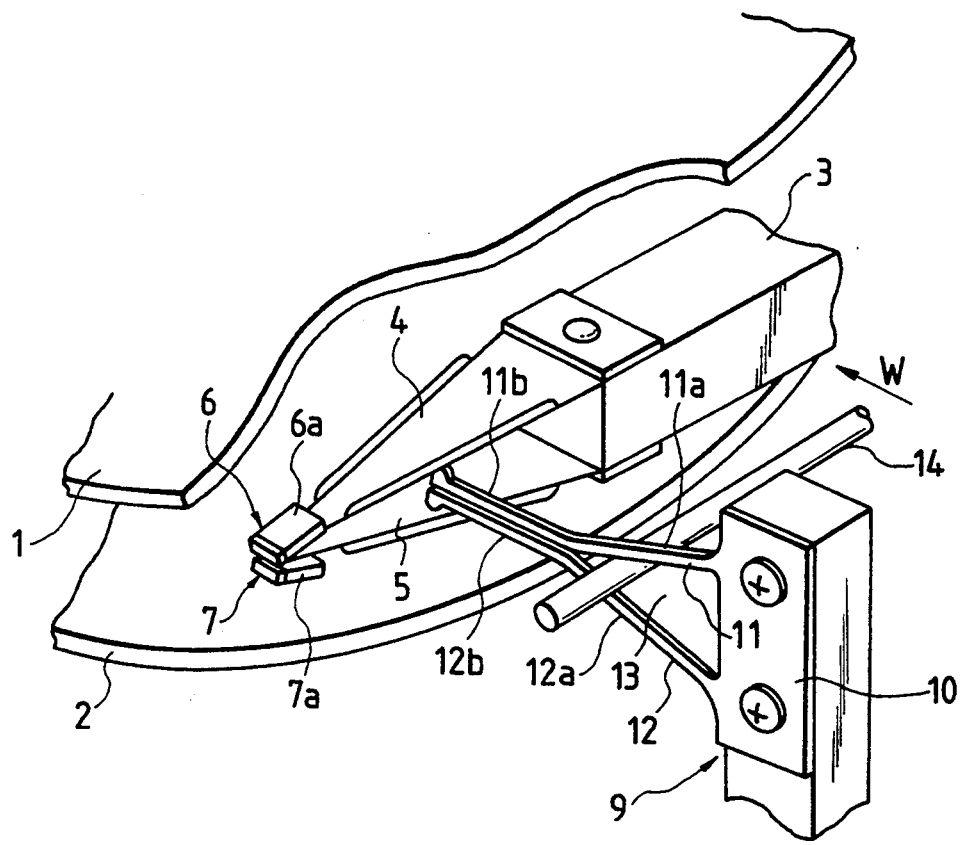
FIG. 1 is a fragmentary enlarged perspective view, with parts cutaway for brevity, of a magnetic disk drive according to the present invention.

FIG. 1 perspectively shows a magnetic disk drive embodying the present invention.

Figure 15:
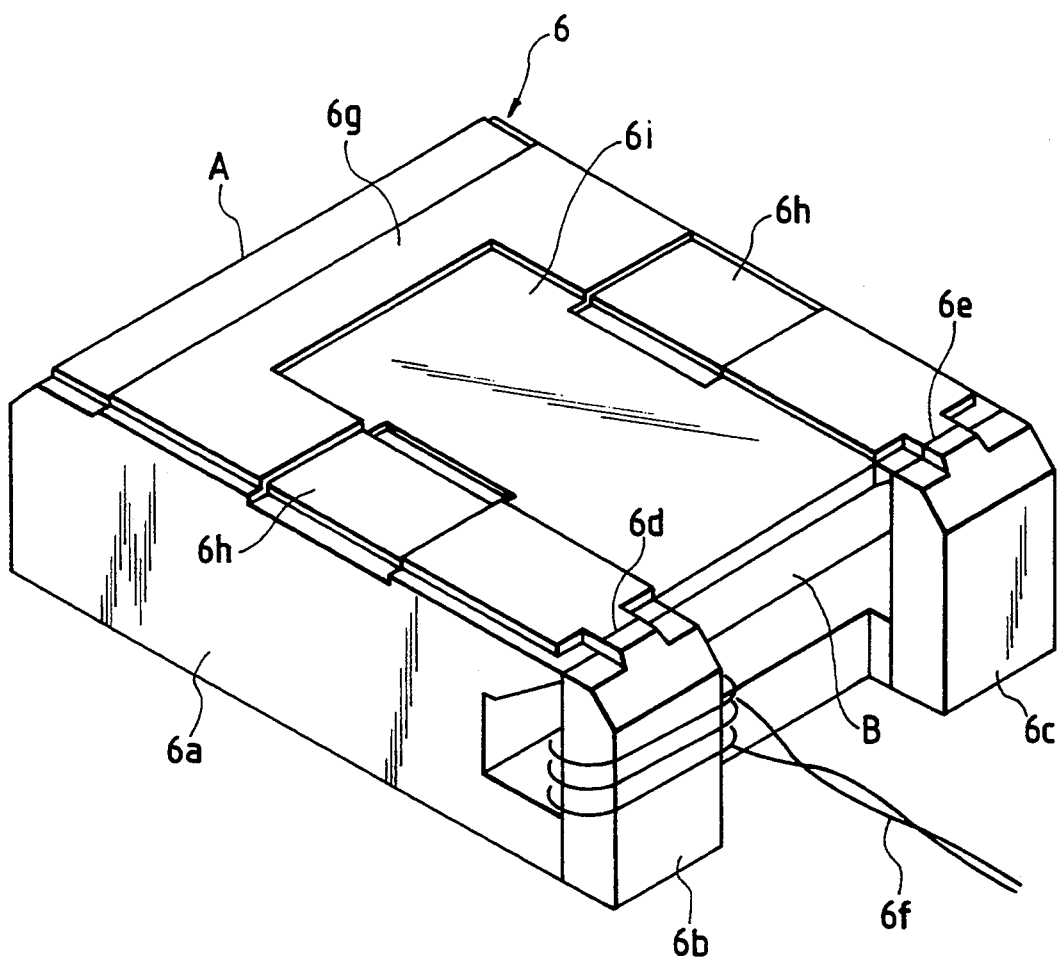
FIG. 15 is an enlarged perspective view of a floating magnetic head of the conventional magnetic disk drive.

The magnetic disk drive generally comprises a plurality (two being shown) of parallel spaced magnetic disks 1, 2 mounted concentrically on a single rotary shaft or spindle (not shown), an access arm 12 driven by a voice coil motor (not shown) and movable in a direction parallel to the plane of the magnetic disks 1, 2, a pair of flexures 4, 5 formed of stamped plate springs and clinched to the opposite sides of the arm 3, and a flexure pusher 9 for forcing the flexures 4, 5 outwardly away from each other against the resiliency thereof. The flexure 4 is disposed in confrontation with the magnetic disk 1, while the flexure 5 is disposed in confrontation with the magnetic disk 2. The flexures 4, 5 are bent inwardly toward each other at portions adjacent to their fixed ends. The flexures 4, 5 carry on their distal ends a pair of floating magnetic heads 6, 7, respectively, in such a manner that the magnetic heads 6, 7 carried on the flexures 4, 5 face toward the corresponding magnetic disks 1, 2. The magnetic heads 6, 7 have negative pressure sliders 6a, 7a, respectively, and, when the flexures 4, 5 are not subjected to external forces, the magnetic heads 6, 7 are spaced far from the recording surfaces of the respective magnetic disks 1, 2. The magnetic heads 6, 7 are identical in construction and have the same construction as the conventional magnetic heads 6, 7 described above with reference to FIG. 15 and, therefore, a further description is no longer needed.

The flexure pusher 9 is composed of an elongate flat base 10 disposed vertically and a pair of load pins 11, 12 formed integrally with the flat base 10 and projecting laterally from the flat base 10 into a space between the flexures 4, 5. The load pins 11, 12 have rounded front ends disposed between the flexures 4, 5 and engageable with substantially central portions of the respective flexures 4, 5. The load pins 11, 12 are formed by etching from a metallic substance, such as a metal plate, and surface-treated to avert formation of a metallic dust due to abrasive wear. Proximal ends of the load pins 11, 12 are widely spaced from one another. The load pins 11, 12 include oblique portions 11a, 12a extending convergently from the base 10 toward the front ends of the load pins 11, 12, and parallel spaced horizontal portions 11b, 12b extending contiguously from front ends of the oblique portions 11a, 11b and confronting to one another. The front end parts of the horizontal portions 11b, 12b are disposed between the flexures 4, 5. The oblique portions 11a, 12a define jointly with the base 10 a substantially triangular space in which a round pin 14 is disposed for actuating the load pins 11, 12. The round pin 14 is driven by a drive unit or actuator in the direction indicated by the arrow W shown in FIG. 1.

Operation of the magnetic disk drive of the foregoing construction will be described below with reference to FIGS. 2 through 4.

When the magnetic disk drive is connected to a power line, the voice coil motor (not shown) is energized to rotate the magnetic disks 1, 2 concurrently. Then, the actuator, not shown, is driven to move the round pin 14 transversely in the direction indicated by the arrow K in FIG. 2 in a plane parallel to the plane of the magnetic disks 1, 2. The round pin 14, as it moves in the direction of the arrow K, first engages the oblique portions 11a, 12a of the respective load pins 11, 12 and then gradually forces the load pins 11, 12 to spread toward the corresponding magnetic disks 1, 2 against the resiliency thereof. A further advancing movement of the round pin 14 causes the front ends of the respective load pins 11, 12 to first engage the corresponding flexures 4, 5 and subsequently resiliently deform or bend the flexures 4, 5 toward the magnetic disks 1, 2. During that time, the magnetic heads 6, 7 move close to the corresponding magnetic disks 1, 2 and then are kept floating on the magnetic disks 1, 2 under the action of dynamic pressures, as shown in FIG. 3. Data are thus recorded on, or read from, the magnetic disks 1, 2 by means of the floating magnetic heads 6, 7. Thereafter, the round pin 14 is moved in a direction opposite to the arrow K (FIG. 2) until it arrives at its initial position between the oblique portions 11a, 12a of the load pins 11, 12, as shown in FIG. 4.

As viewed in the light of working accuracy, it is hardly possible to arrange the magnetic heads 6, 7 in such a manner that the magnetic heads 6, 7 can be displaced evenly through the same distance until they reach the respective floating positions, and the movement of the load pins 11, 12 in a direction to spread the flexures 4, 5 is terminated when both magnetic heads 6, 7 concurrently come into the floating condition. To enable the magnetic heads 6, 7 to float reliably over the magnetic disks 1, 2, it is desirable to spread the pins 11, 12 to a certain extent until the magnetic heads 6, 7 approach the magnetic disks 1, 2 beyond a critical point (floating position) where the magnetic heads 6, 7 begin to float over the magnetic disks 1, 2. With this arrangement, the magnetic heads 6, 7 are reliably brought into the floating condition even when the flexures 4, 5 are displaced unevenly due, for example, to an assembling error. It may be considered that the excess spreading movement of the load pins 11, 12 brings about a frictional engagement between the magnetic heads 6, 7 and the magnetic disks 1, 2 which will damage at least the magnetic heads 6, 7 or the magnetic disks 1, 2. However, such frictional engagement does not take place in practice because of the reasons described below. As the load pins 11, 12 force the flexures 4, 5 toward the magnetic disks 1, 2, the magnetic heads 6, 7 approach the corresponding magnetic disks 1, 2. When the magnetic heads 6, 7 reach the floating position, positive pressures are developed between the magnetic disks 1, 2 and the corresponding magnetic heads 6, 7, due to the coaction between the negative pressure sliders 6a, 7a and the magnetic disks 1, 2. The positive pressure thus developed tends to force the magnetic heads 6, 7 away from the magnetic disks 1, 2. When the load pins 11, 12 are further forced to spread for advancing the magnetic heads 6, 7 toward the magnetic disks 1, 2, the parallel portions 11b, 12b of the load pins 11, 12 resiliently flex or bend inwardly toward each other as the resiliency of the load pins 11, 12 is overcome by the positive pressures acting on the magnetic heads 6, 7. The magnetic heads 6, 7 can, therefore, be kept in the floating position. As described above, when the load pins 11, 12 are forced to spread to move the magnetic heads 6, 7 toward the magnetic disks 1, 2 beyond the floating position, the load pins 11, 12 flex or bend in a direction away from the magnetic disks 1, 2, thus keeping the magnetic heads 6, 7 out of contact with the magnetic disks 1, 2. In order to enable the resilient deformation stated above, the load pins 11, 12 must have a predetermined elastic coefficient or resiliency which is determined by the material used for the formation of the load pins 11, 12, and the size and shape of the load pins 11, 12.

Figure 2:
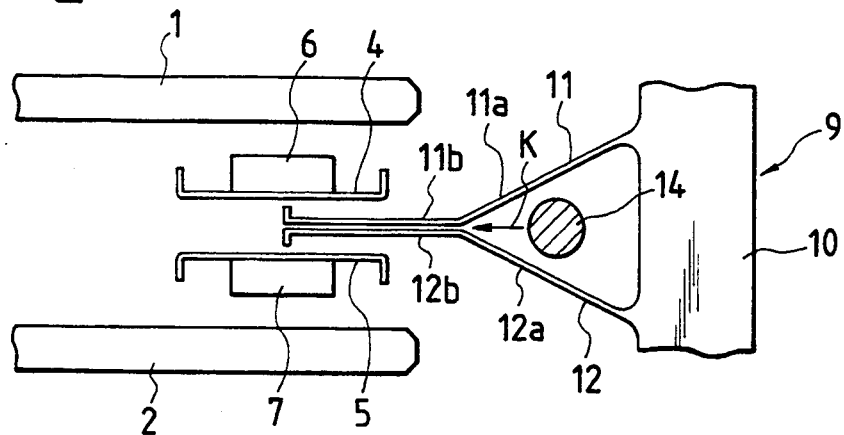
FIGS. 2 through 4 are side views illustrative of the operation of the magnetic disk drive.
Figure 3:
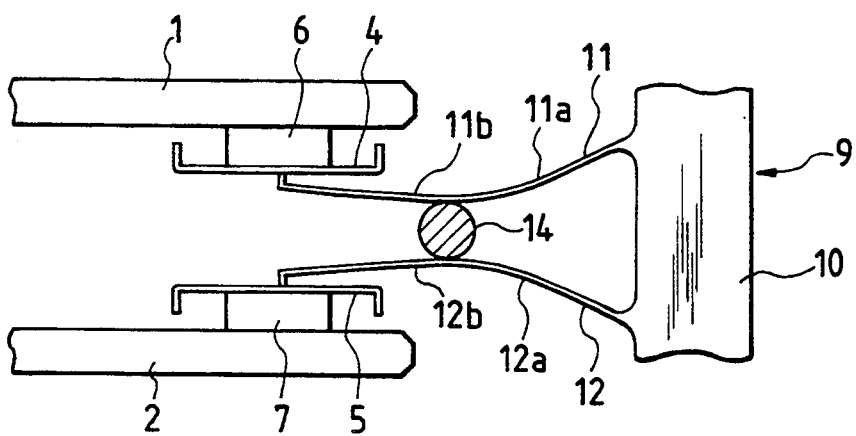
Figure 4:
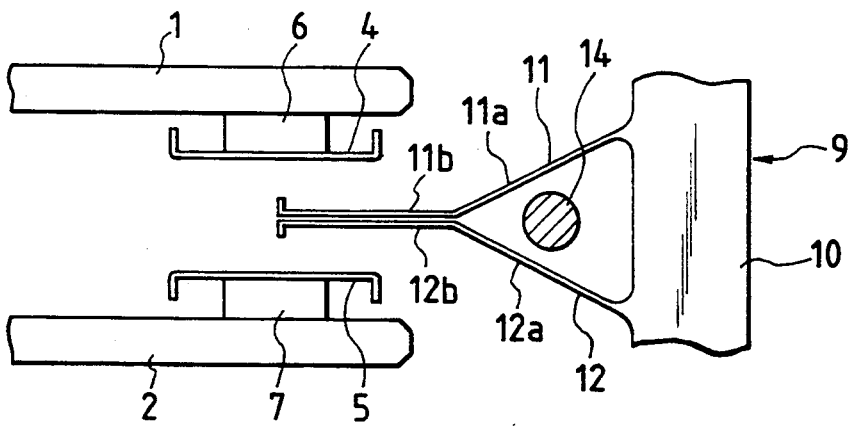

When the magnetic heads 6, 7 are to be returned from the loading position shown in FIG. 4 to the unloading position shown in FIG. 2, the motor is de-energized whereupon the rotational speed of the magnetic disk 1, 2 is gradually slowed down. In this instance, the negative pressures acting on the respective magnetic heads 6, 7 gradually reduce with a reduction of the rotational speed of the magnetic disks 1, 2. When the negative pressures are overcome by the resiliency of the flexures 4, 5, the flexures 4, 5 spring back inwardly toward each other to restore their original shape shown in FIG. 2. The magnetic heads 6, 7 are thus displaced from the respective positions which are spaced far from the magnetic disks 1, 2.

As described above, the resiliently bendable load pins 11, 12 are able to force the magnetic heads 6, 7 toward the corresponding magnetic disks 1, 2 beyond the floating position, so that both magnetic heads 6, 7 are put into the floating position even when they are displaced over different distances. Since the flexures 4, 5 carrying on their front ends the magnetic heads 6, 7 are spread by the resiliently bendable load pins 11, 12, and since the resiliency of the resiliently bendable load pins 11, 12 is overcome by the positive pressure acting on the magnetic heads 6, 7, the magnetic heads 6, 7 are held out of frictional engagement with the corresponding magnetic disks 1, 2 even when the load pins 11, 12 are forced to excessively spread the flexures 4, 5.

When the speed of movement of the round pin 14 in the direction of the arrow K in FIG. 2 is excessively large, the front ends of the respective load pins 11, 12 impinge upon the flexures 4, 5 and thereby vibrate the flexures 4, 5 and the magnetic heads 6, 7. Under such vibrated condition, a stable loading is difficult to perform. To insure a stable loading, it is important to control the speed of movement of the round pin 14 below a predetermined level. The speed of movement of the round pin 14 sometimes varies with the characteristics of individual components of the magnetic disk drive, so that an adjustment of this speed is needed for each individual magnetic disk drive.

Figure 5:
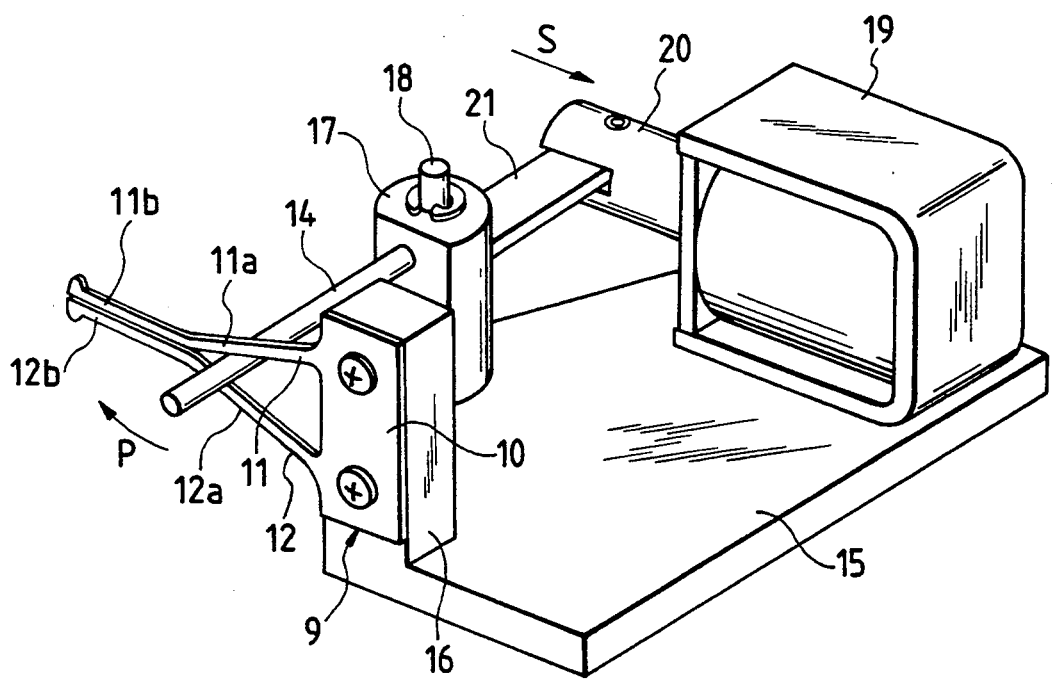
FIG. 5 is a perspective view of a drive unit used for actuating a round pin of the magnetic disk drive.

The control of the speed of movement of the round pin 14 will be described below with reference to FIGS. 5 through 9. As shown in FIG. 5, the round pin 14 is driven by a drive unit or actuator comprised of a solenoid 19. The solenoid 19 is fixedly mounted on a base plate 15 having an upstanding support member 16 to which the flexure pusher 9 is screwed. As described above, the flexure pusher 9 is composed of an elongated flat base 10 and a pair of load pins 11, 12 integral with the flat base 10. A pivot member 17 is rotatably mounted on a vertical shaft 18 secured to the base plate 15. The round pin 14 has one end press-fitted with the pivot member 17. The solenoid 19 has a movable iron bar 20 pivotally connected to one end of an arm 21, the opposite end of the arm 21 being secured to the pivot member 17.

With this construction, when a voltage is applied to the solenoid to energize the same, the movable iron bar 20 is drawn into a body of the solenoid, as indicated by the arrow S in FIG. 5, thereby turning the arm 21 and the pivot member 17 clockwise about the axis of the shaft 18. Clockwise movement of the pivot member 17 causes the round pin 14 to turn in the same direction as indicated by the arrow P so that the load pins 11, 12 are spread by the round pin 14. The solenoid 19 is de-energized when the applied voltage disappears. In this instance, the movable iron bar 20 moves into the extended position shown in FIG. 5 so that the round pin 14 is returned to its initial position between the load pins 11, 12.

Figure 6:
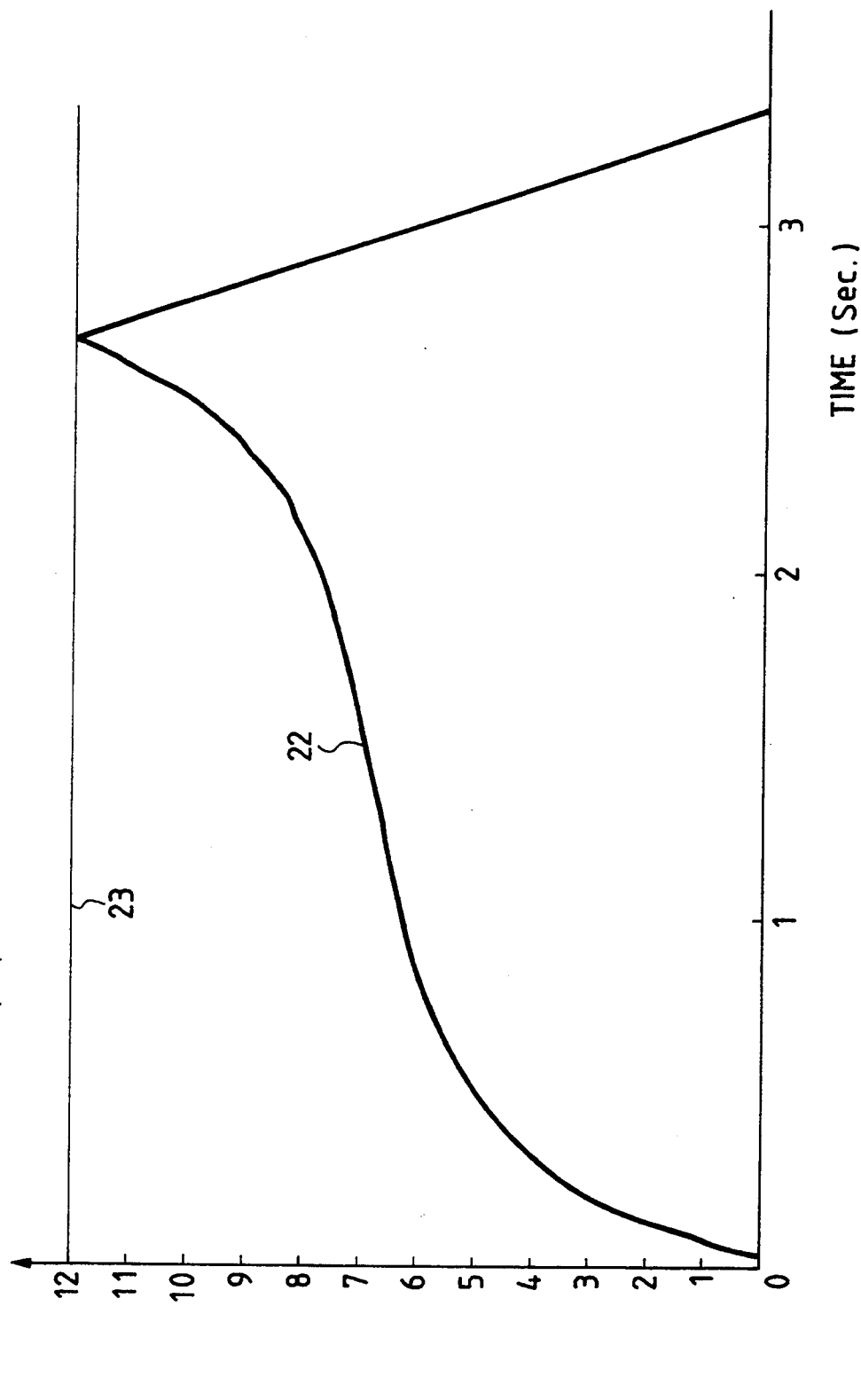
FIG. 6 is a graph showing the correlation between the voltage applied to a solenoid and the time period during which the applied voltage exists.
Figure 7:
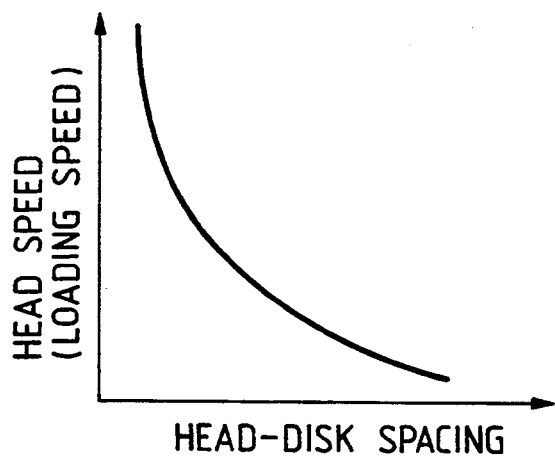
FIG. 7 is a graph showing the correlation between the head speed and the head-disk spacing observed when the solenoid is suppled with a constant voltage.
Figure 8:
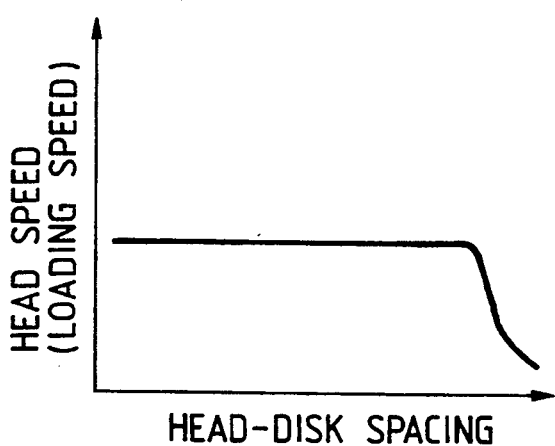
FIG. 8 is a graph showing the correlation between the head speed and the head-disk spacing observed when the solenoid is suppled with a controlled voltage.

The voltage applied to the solenoid 19 is controlled to regulate the speed of movement of the round pin 14 in such a manner that the magnetic heads 6, 7 (FIG. 1) advance toward the magnetic disks 1, 2 (FIG. 1) at a constant speed. FIG. 6 is a graph showing the correlation between the voltage applied to the solenoid and the time during which the voltage exists. In FIG. 6, a controlled applied voltage is designated by 22, while an uncontrolled constant voltage applied for comparative purposes to the solenoid 19 is designated by 23. FIG. 7 is a graph illustrative of the correlation between the head speed and the head-disk distance or spacing observed when the uncontrolled constant voltage 23 is applied to the solenoid 19. On the other hand, FIG. 8 is a graph showing the correlation between the head speed and the head-disk spacing observed when the controlled voltage 22 is applied to the solenoid 19. As appears clear from FIG. 7, the head speed increases as the head-disk spacing decreases. This means that when the constant applied voltage 23 (FIG. 6) is used, the magnetic heads gradually and continuously increase their speed as they approach the corresponding magnetic disks. With this varying head speed, it is hardly possible to determine a speed of movement of the magnetic heads at the moment when the magnetic heads arrive at the floating position. As evidenced from FIG. 8, when the controlled voltage 22 (FIG. 6) is applied to the solenoid, the magnetic heads approach the corresponding magnetic disks at a substantially constant speed regardless of changes in the head-disk spacing. It is, therefore, readily possible to determine a head speed at the moment when the magnetic heads arrive at the floating position. The head speed is set by calculation to a level which is low enough to prevent an accidental engagement between the magnetic heads and the magnetic disks which would otherwise take place due to an undue acceleration of the magnetic heads.

Figure 9:
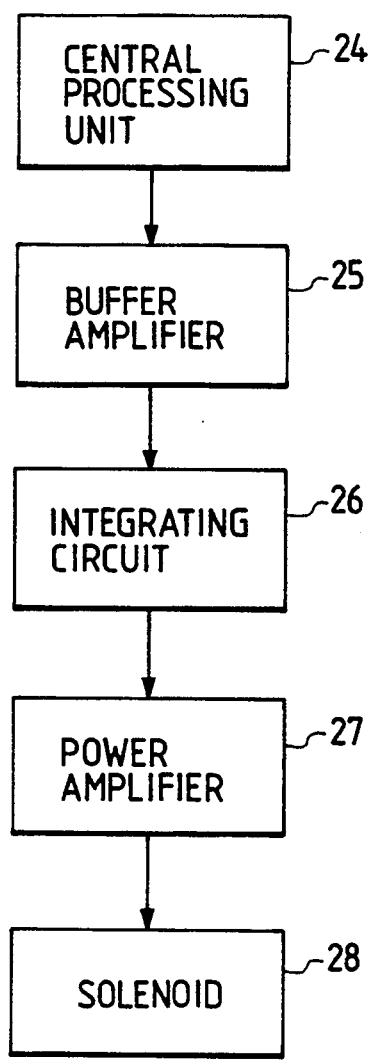
FIG. 9 is a block diagram showing an arrangement for applying the controlled voltage to the solenoid.
Figure 10:
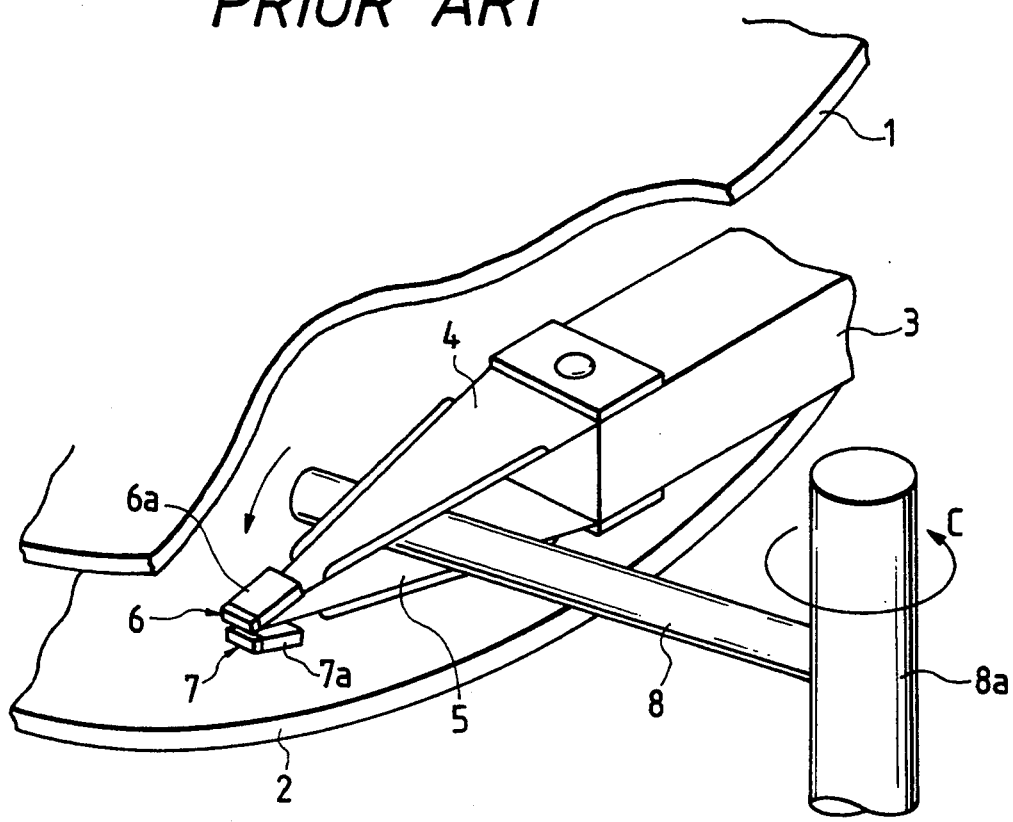
FIG. 10 is a fragmentary enlarged perspective view, with parts cutaway for brevity, of a conventional magnetic disk drive.
Figure 11:
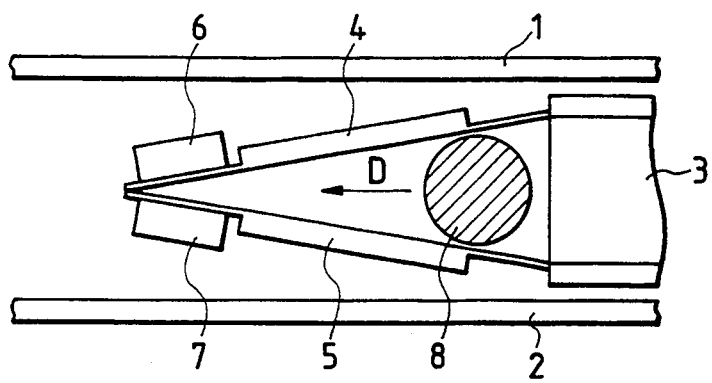
FIGS. 11 through 13 are side views showing the manner in which the conventional magnetic disk drive operates.
Figure 12:
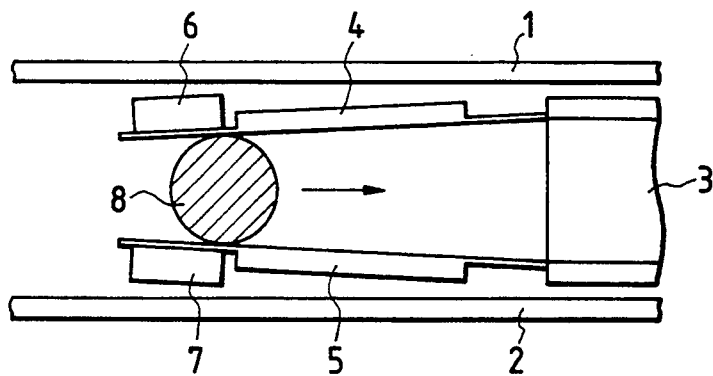
Figure 13:
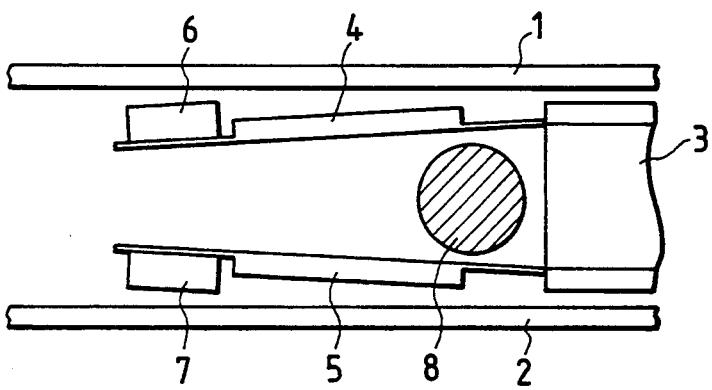
Figure 14:
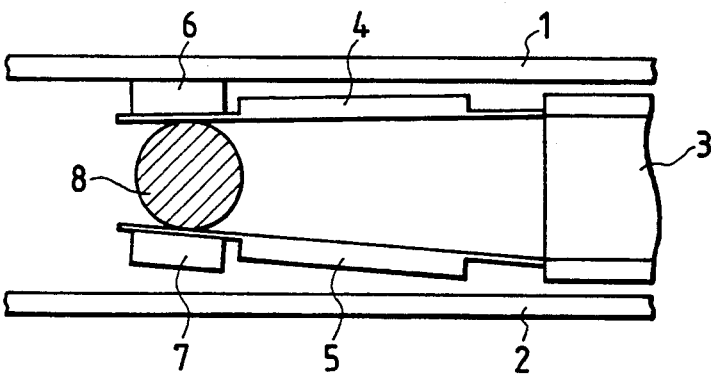
FIG. 14 is a side view illustrative of a problem associated with the conventional magnetic disk drive.

FIG. 9 shows the general construction of an apparatus for supplying the control voltage 22 (FIG. 6) to the solenoid 28 (identical to the solenoid 19 shown in FIG. 5). The apparatus includes a central processing unit 24 for producing a pulse-duration modulated output, a buffer amplifier 25 for amplifying the pulse-duration modulated output and delivering the same to an integrating circuit 26. An integrated output from the integrating circuit 26 is inputted to a power amplifier 27 to drive the solenoid 28. In this instance, the intensity of a current applied to energize the solenoid 28 varies with the pulse duration of the pulse-duration modulated output which is delivered from the central processing unit 24. More specifically, the voltage applied to the solenoid 28 increases with an increase in the pulse duration of the pulse-duration modulated output and decreases with a reduction in the pulse duration of the pulse-duration modulated output. The central processing unit 24 has a pattern of pulse duration previously stored therein for producing a pulse-duration modulated output and outputting the pulse-duration modulated output of the stored pattern to control the operation of the solenoid 28.

Obviously, various minor changes and modifications of the present invention are possible in the light of the above teaching. It is therefore to be understood that within the scope of the appended claims the invention may be practiced otherwise than as specifically described.

What is claimed is:

1. A magnetic disk drive comprising:
   (a) a magnetic disk;
   (b) a floating magnetic head having a negative pressure slider and confronting said magnetic disk to undertake at least one of a magnetic data recording operation and a magnetic data reading operation relative to said magnetic disk while said magnetic head is held in a floating position in which said magnetic head is floating over said magnetic disk by virtue of a positive pressure created between said magnetic head and said magnetic disk due to the coaction between said negative pressure slider and said magnetic disk;
   (c) a flexure carrying thereon said magnetic head and normally holding said magnetic head in a position spaced relatively far from said magnetic disk; and
   (d) a resilient load pin normally held out of contact with said flexure and engageable with said flexure to urge the same toward said magnetic disk for displaying said magnetic head toward said magnetic disk, said resilient load pin having a resiliency and being so configured such that said resilient load pin is able to force said flexure toward said magnetic disk until said magnetic head moves toward said magnetic disk beyond said floating position, and that said resilient load pin is overcome by said positive pressure and resiliently flexes in a direction away from said magnetic disk when urging said flexure to move said magnetic head toward said magnetic disk beyond said floating position.

2. A magnetic disk drive according to claim 1, wherein said load pin is engageable with a substantially central portion of said flexure.

3. A magnetic disk drive according to claim 1, wherein said load pin is formed of an etched metal.

4. A magnetic disk drive comprising:
   (a) a pair of concentric, parallel spaced magnetic disks connected together for corotation with each other;
   (b) an arm movable between said magnetic disks;
   (c) a pair of flexures attached to said arm and confronting said magnetic disks, respectively, said flexures being normally spaced relatively far from said magnetic disks;
   (d) a pair of floating magnetic heads having a pair of negative pressure sliders, respectively, and carried on front ends of the respective flexures at respective sides which face toward corresponding ones of said magnetic disks, each of said flexures normally holding a corresponding one of said magnetic heads in a position spaced relatively far from a corresponding one of said magnetic disks;

(e) a pair of resilient pusher members normally spaced from said flexures and engageable with said flexures, respectively, to urge them toward said magnetic disks until said magnetic heads are displaced toward said magnetic disks beyond a floating position in which said magnetic heads are floating over said magnetic disks by virtue of a positive pressure created between said magnetic heads and said magnetic disks due to the coaction between said negative pressure sliders and said magnetic disks; and (f) means for urging said pusher members towards said flexures, said resilient pusher members being overcome by said positive pressure and resiliently flexing in a direction away from said magnetic disks when they are urged by said urging means to move said magnetic heads toward said magnetic disks beyond said floating position.

5. A magnetic disk drive according to claim 4, wherein each of said resilient pusher members comprises a load pin.

6. A magnetic disk drive according to claim 4, wherein said urging means comprises a rigid pin.

7. A magnetic disk drive according to claim 4, wherein each of said pusher members is formed of an etched metal.

8. A magnetic disk drive comprising:
(a) a pair of concentric, parallel spaced magnetic disks connected together for corotation with each other;
(b) an arm movable between said magnetic disks;
(c) a pair of flexures attached to said arm and confronting said magnetic disks, respectively, said flexures being normally spaced relatively far from said magnetic disks;
(d) a pair of floating magnetic heads having a pair of negative pressure sliders, respectively, and carried on front ends of the respective flexures at respective sides which face toward corresponding ones of said magnetic disks, each of said flexures normally holding a corresponding one of said magnetic heads in a position spaced relatively far from a corresponding one of said magnetic disks;
(e) a pair of resilient load pins having a pair of spaced oblique portions, respectively, extending convergently toward their respective front ends and a pair of parallel spaced portions, respectively, extending contiguously from the front ends of said respective oblique portions and confronting one another; and
(f) a pin normally disposed in a space defined between said oblique portions of said load pins and movable toward said parallel portions to spread said load pins for causing them to force said flexures toward said magnetic disks for displacing said magnetic heads toward said magnetic disks, said resilient load pins resiliently flexing in a direction away from said magnetic disks when they are urged by said pin to move said magnetic heads toward said magnetic disks beyond a floating position.

9. A magnetic disk drive according to claim 8, wherein said pin comprises a rigid pin.

10. A magnetic disk drive according to claim 8, wherein each of said load pins is formed of an etched material.

11. A magnetic disk drive comprising:
(a) a magnetic disk;

(b) a floating magnetic head having a negative pressure slider and confronting said magnetic disk to undertake at least one of a magnetic data recording operation and a magnetic data reading operation relative to said magnetic disk while said magnetic head is held in a floating position in which said magnetic head is floating over said magnetic disk by virtue of a positive pressure created between said magnetic head and said magnetic disk due to the coaction between said negative pressure slider and said magnetic disk;

(c) a flexure carrying thereon said magnetic head in a position spaced relatively far from said magnetic disk; and (d) a resilient load pin normally held out of contact with said flexure and engageable with said flexure to urge the same toward said magnetic disk for displacing said magnetic head toward said magnetic disk, said resilient load pin being overcome by said positive pressure and resiliently flexing in a direction away from said magnetic disk when urging said flexure to move said magnetic head toward said magnetic disk beyond said floating position.

12. A magnetic disk drive comprising:
(a) a pair of concentric, parallel spaced magnetic disks connected together for corotation with each other;
(b) an arm movable between said magnetic disks;
(c) a pair of flexures attached to said arm and confronting said magnetic disks, respectively, said flexures being spaced relatively far from said magnetic disks;
(d) a pair of floating magnetic heads having a pair of negative pressure sliders, respectively, and carried on front ends of the respective flexures at respective sides which face toward corresponding ones of said magnetic disks, each of said flexures normally holding a corresponding one of said magnetic heads in a position spaced relatively far from a corresponding one of said magnetic disks;
(e) a pair of resilient pusher members normally spaced from said flexures and engageable with said flexures, respectively, to urge them toward said magnetic disks until said magnetic heads are displaced toward said magnetic disks beyond a floating position in which said magnetic heads are floating over said magnetic disks by virtue of a positive pressure created between said magnetic heads and said magnetic disks due to the coaction between said negative pressure sliders and said magnetic disks; and
(f) means for urging said pusher members toward said flexures, said pusher members resiliently flexing in a direction away from said magnetic disks when they are urged by said urging means to move said magnetic heads toward said magnetic disks beyond said floating position.

13. A magnetic disk drive comprising:
(a) a pair of concentric, parallel spaced magnetic disks connected together for corotation with each other;
(b) an arm movable between said magnetic disks;
(c) a pair of flexures attached to said arm and confronting said magnetic disks, respectively, said flexures being normally spaced relatively far from said magnetic disks;

(d) a pair of floating magnetic heads having a pair of negative pressure sliders, respectively, and carried on front ends of the respective flexures at respective sides which face toward corresponding ones of said magnetic disks, each of said flexures normally holding a corresponding one of said magnetic heads in a position spaced relatively far from a corresponding one of said magnetic disks;

(e) a pair of resilient load pins having a pair of spaced oblique portions, respectively, extending convergently toward their respective front ends and a pair of parallel spaced portions, respectively, extending contiguously from the front ends of said respective oblique portions and confronting one another; and (f) a pin normally disposed in a spaced defined between said oblique portions of said load pins and movable toward said parallel portions to spread said load pins for causing them to force said flexures toward said magnetic disks for displacing said magnetic heads toward said magnetic disks, said load pins resiliently flexing in a direction away from said magnetic disks when spread by said pin to move said magnetic heads toward said magnetic disks beyond a floating position.

* * * * *